(12) United States Patent
Kobayashi et al.

(10) Patent No.: US 12,522,227 B2
(45) Date of Patent: Jan. 13, 2026

(54) USING ABNORMALITIES WITH USER AND ELECTRONIC PARKING BRAKE DATA FOR VEHICLE CONTROL

(71) Applicant: HONDA MOTOR CO., LTD., Tokyo (JP)

(72) Inventors: Takuma Kobayashi, Tokyo (JP); Yuko Sugimura, Tokyo (JP); Yuichi Masukake, Tokyo (JP); Yugo Kajiwara, Tokyo (JP); Yuichi Komori, Tokyo (JP); Shohei Noai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 18/503,834

(22) Filed: Nov. 7, 2023

(65) Prior Publication Data

US 2024/0149894 A1 May 9, 2024

(30) Foreign Application Priority Data

Nov. 9, 2022 (JP) .................................. 2022-179335

(51) Int. Cl.
| | |
|---|---|
| *B60W 50/029* | (2012.01) |
| *B60Q 1/50* | (2006.01) |
| *B60W 10/18* | (2012.01) |
| *B60W 30/18* | (2012.01) |
| *B60W 40/08* | (2012.01) |

(Continued)

(52) U.S. Cl.
CPC .......... *B60W 50/029* (2013.01); *B60Q 1/544* (2022.05); *B60W 10/18* (2013.01); *B60W 30/18063* (2013.01); *B60W 40/08* (2013.01); *B60W 50/0205* (2013.01); *B60W 50/14* (2013.01); *G06V 20/597* (2022.01);
(Continued)

(58) Field of Classification Search
CPC ........................... B60W 50/029; G06V 20/597
See application file for complete search history.

(56) References Cited

U.S. PATENT DOCUMENTS

| | | | |
|---|---|---|---|
| 10,073,452 B2 * | 9/2018 | Niino | B60W 30/16 |
| 11,883,955 B1 * | 1/2024 | Smith | G05B 19/406 |

(Continued)

FOREIGN PATENT DOCUMENTS

| | | |
|---|---|---|
| JP | 2017-019410 A | 1/2017 |
| JP | 2018-062309 A | 4/2018 |

*Primary Examiner* — Jess Whittington
(74) *Attorney, Agent, or Firm* — Paratus Law Group, PLLC

(57) ABSTRACT

A vehicle control device includes: a recognition unit configured to recognize a surrounding condition of a vehicle; a driving control unit configured to control acceleration, deceleration, and steering of the vehicle based on a recognition result; and a vehicle abnormality detection unit configured to detect an abnormality in an electric parking brake device. When an abnormality in the driver is detected during traveling of the vehicle, the driving control unit performs control to decelerate the vehicle to a predetermined speed greater than zero by braking by a brake device. In a case where an abnormality in the electric parking brake device is detected before or at a time the vehicle is decelerated to the predetermined speed, the driving control unit causes the vehicle to perform traveling along a traveling road until the recognition unit recognizes a preceding vehicle after the vehicle is decelerated to the predetermined speed.

12 Claims, 6 Drawing Sheets

(51) Int. Cl.
  *B60W 50/02*   (2012.01)
  *B60W 50/14*   (2020.01)
  *G06V 20/59*   (2022.01)

(52) U.S. Cl.
  CPC ............... *B60W 2040/0818* (2013.01); *B60W 2420/403* (2013.01); *B60W 2540/229* (2020.02)

(56) References Cited

U.S. PATENT DOCUMENTS

| | | | |
|---|---|---|---|
| 2005/0264099 A1* | 12/2005 | Kamiya | B60T 7/22 |
| | | | 303/15 |
| 2016/0001781 A1* | 1/2016 | Fung | G07C 9/37 |
| | | | 701/36 |
| 2017/0008534 A1 | 1/2017 | Nakatsuka et al. | |
| 2018/0105168 A1 | 4/2018 | Kozuka | |
| 2021/0229658 A1* | 7/2021 | Tsuji | B60W 60/0016 |
| 2022/0017092 A1* | 1/2022 | Kim | B60W 30/18109 |
| 2022/0153260 A1* | 5/2022 | Hamada | B60W 30/06 |
| 2022/0402470 A1* | 12/2022 | Toth | B60W 50/035 |
| 2023/0264699 A1* | 8/2023 | Kiriki | B60W 30/08 |
| | | | 701/25 |

* cited by examiner

USING ABNORMALITIES WITH USER AND ELECTRONIC PARKING BRAKE DATA FOR VEHICLE CONTROL

CROSS-REFERENCE TO RELATED APPLICATIONS

This application is based upon and claims the benefit of priority from prior Japanese patent application No. 2022-179335, filed on Nov. 9, 2022, the entire contents of which are incorporated herein by reference.

TECHNICAL FIELD

The present disclosure relates to a vehicle control device.

BACKGROUND ART

In recent years, attempts have been made to provide access to a sustainable transport system in consideration of vulnerable traffic participants. In order to improve the safety and convenience of traffic, research and development related to a driving support technique and an automated driving technique of a vehicle such as an automobile have been conducted as one of the attempts.

As an example of the driving support technique, for example, there is a technique of automatically stopping (in other words, halting) a vehicle when it is detected that a driver is in an abnormal state (for example, a drowsy driving state or a mental and physical function stop state) in which the driver loses the ability to drive the vehicle.

For example, JP2017-019410A below discloses a technique of automatically stopping a vehicle regardless of presence or absence of a steering operation when an emergency situation is detected or estimated by an emergency situation detection unit and an accelerator non-operation state lasting for a predetermined period time or longer is detected by an accelerator operation detection unit during traveling of the vehicle.

In addition, JP2018-062309A below discloses a technique of decelerating a vehicle by controlling a deceleration of the vehicle to a predetermined value or more when driving support control cannot be normally performed due to a reason other than an abnormality in a braking device in a condition in which a driver is determined to be in an abnormal state.

SUMMARY

When a brake device is continuously operated for a long time, the brake device may fail, and braking performed by the brake device may be unable to be performed. For this reason, when a stop state of the vehicle is to be maintained for a long time, a parking brake device is generally used. However, it is considered that an abnormality may occur in the parking brake device. In the related art, there is room for improvement of the vehicle when an abnormality in a driver or an abnormality in an electric parking brake device occurs from the viewpoint of ensuring the safety.

More specifically, for example, in a so-called "shift-by-wire" vehicle capable of electronically controlling a shift position of a transmission, even when an abnormality in a driver and an abnormality in an electric parking brake device occur, there is a possibility that a stop state of the vehicle may be maintained by electronically changing the shift position to a "P" range (parking range) after the vehicle is stopped by the brake device. In contrast, in a case of a so-called "non-shift-by-wire" vehicle whose transmission is a mechanical transmission, a shift position cannot be electronically changed to a "P" range, and thus a stop state of the vehicle cannot be maintained when an abnormality in an electric parking brake device occurs. Further, in the "shift-by-wire" vehicle, when the shift position cannot be electronically controlled due to an abnormality in the transmission or the like, a problem similar to that of the "non-shift-by-wire" vehicle occurs.

The present disclosure relates to providing a vehicle capable of ensuring safety of the vehicle even when an abnormality in a driver and an abnormality in an electric parking brake device occur.

According to an aspect of the present disclosure, there is provided a vehicle control device for controlling a vehicle, the vehicle including a wheel to be driven by a drive device, a brake device configured to brake the wheel, and an electric parking brake device configured to fix the wheel by electronic control, the vehicle control device including:
  a recognition unit configured to recognize a surrounding condition of the vehicle;
  a driving control unit configured to control acceleration, deceleration, and steering of the vehicle based on a recognition result of the recognition unit;
  a driver abnormality detection unit configured to detect an abnormality in a driver of the vehicle; and
  a vehicle abnormality detection unit configured to detect an abnormality in the electric parking brake device, in which,
  when an abnormality in the driver is detected by the driver abnormality detection unit during traveling of the vehicle, the driving control unit performs control to decelerate the vehicle to a predetermined speed greater than zero by braking by the brake device, and,
  in a case where the vehicle abnormality detection unit detects an abnormality in the electric parking brake device before the vehicle is decelerated to the predetermined speed or at a time the vehicle is decelerated to the predetermined speed, the driving control unit causes the vehicle to perform traveling along a traveling road until the recognition unit recognizes a preceding vehicle after the vehicle is decelerated to the predetermined speed.

According to the present disclosure, it is possible to provide a vehicle capable of ensuring safety of the vehicle even when an abnormality in a driver and an abnormality in an electric parking brake device occur.

BRIEF DESCRIPTION OF DRAWINGS

Exemplary embodiment(s) of the present invention will be described in detail based on the following figures, wherein.

DESCRIPTION OF EMBODIMENTS

Figure 1:
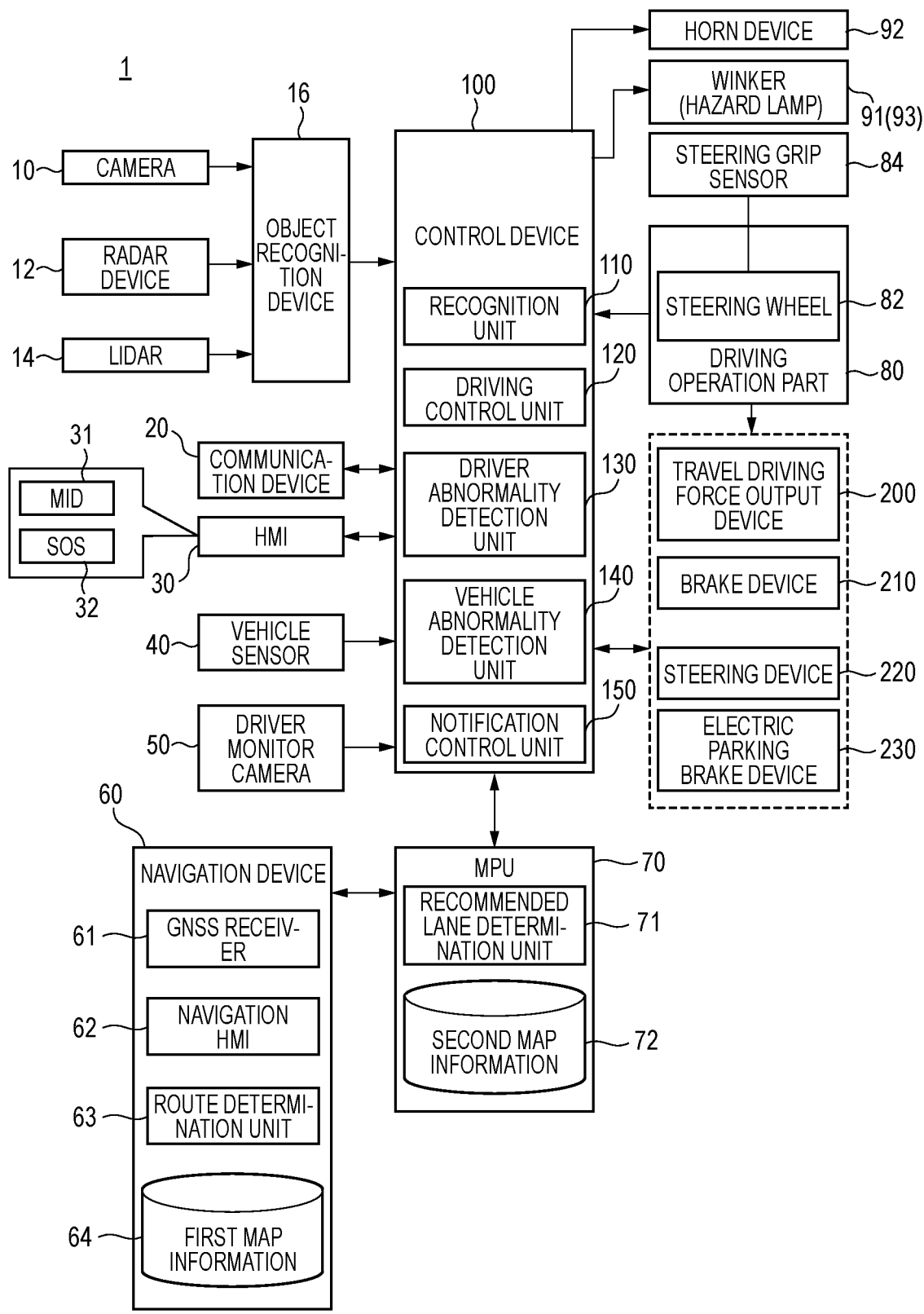
FIG. 1 is a block diagram illustrating an overall configuration of a vehicle system 1 including a control device 100 according to an embodiment.

Hereinafter, an embodiment of a vehicle control device according to the present disclosure will be described with reference to the drawings. Hereinafter, the same or similar elements are denoted by the same or similar reference signs, and a description thereof may be appropriately omitted or simplified. Further, the drawings are to be viewed according to an orientation of the reference numerals.

<Overall Configuration of Vehicle System 1>

FIG. 1 is a block diagram illustrating an overall configuration of a vehicle system 1 including a control device 100 that is an embodiment of a vehicle control device of the present disclosure. Hereinafter, a vehicle on which the vehicle system 1 is mounted is referred to as an "own vehicle M". The own vehicle M is, for example, an automobile such as a two-wheeled automobile, a three-wheeled automobile, or a four-wheeled automobile, and a driving source thereof is an internal combustion engine such as a diesel engine or a gasoline engine, an electric motor, or a combination thereof. The electric motor operates using electric power generated by a generator coupled to the internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a driver monitor camera 50, a navigation device 60, a map positioning unit (MPU) 70, a driving operation part 80, a winker 91 (hazard lamp 93), a horn device 92, a control device 100, a travel driving force output device 200, a brake device 210, a steering device 220, and an electric parking brake device 230. These devices are connected to each other by a multiplex communication line such as a controller area network (CAN) communication line, a serial communication line, or a wireless communication network.

The camera 10 is, for example, a digital camera using a solid-state imaging device such as a charge-coupled device (CCD) or a complementary metal oxide semiconductor (CMOS). The camera 10 is attached at an arbitrary position of the own vehicle M on which the vehicle system 1 is mounted.

The radar device 12 emits radio waves such as millimeter waves to the surroundings of the own vehicle M, and detects radio waves (reflected waves) reflected by an object to detect at least a position (distance and orientation) of the object. The radar device 12 is attached at an arbitrary position of the own vehicle M.

The LIDAR 14 emits light (or an electromagnetic wave having a wavelength close to that of light) to the surroundings of the own vehicle M and measures scattered light. The LIDAR 14 detects a distance to a target based on a time elapsed from light emission to light reception. The emitted light is, for example, pulsed laser light. The LIDAR 14 is attached at an arbitrary postilion of the own vehicle M.

The object recognition device 16 performs sensor fusion processing on some or all of detection results of the camera 10, the radar device 12, and the LIDAR 14 to recognize a position, a type, a speed, and the like of an object. The object recognition device 16 outputs a recognition result to the control device 100. The object recognition device 16 may output the detection results of the camera 10, the radar device 12, and the LIDAR 14 to the control device 100 as they are.

The communication device 20 uses, for example, a cellular network, a Wi-Fi (registered trademark) network, Bluetooth (registered trademark), or dedicated short range communication (DSRC) to communicate with other vehicles present in the surroundings of the own vehicle M or communicate with various server devices via a radio base station.

The HMI 30 presents various types of information to an occupant of the own vehicle M and receives an input operation performed by the occupant. The HMI 30 includes various display devices including a multi-information display (MID) 31, various operators including an SOS button 32, a speaker, a buzzer, and the like.

The vehicle sensor 40 includes a vehicle speed sensor configured to detect a traveling speed (hereinafter also referred to as "vehicle speed") of the own vehicle M, an acceleration sensor configured to detect an acceleration, a yaw rate sensor configured to detect an angular velocity around a vertical axis, an azimuth sensor configured to detect an orientation of the own vehicle M, and the like.

The driver monitor camera 50 is, for example, a digital camera using a solid-state imaging device such as a CCD or a CMOS. The driver monitor camera 50 is attached at an arbitrary position in the own vehicle M in a position and an orientation in which the head of an occupant (hereinafter, also referred to as a "driver") seated in a driver's seat of the own vehicle M is able to be imaged from the front (that is, in an orientation in which the face is imaged).

The navigation device 60 includes, for example, a global navigation satellite system (GNSS) receiver 61, a navigation HMI 62, and a route determination unit 63. The navigation device 60 stores first map information 64 in a storage device such as a hard disk drive (HDD) or a flash memory.

The GNSS receiver 61 specifies a position of the own vehicle M based on a signal received from a GNSS satellite. The position of the own vehicle M may be specified or complemented by an inertial navigation system (INS) using an output of the vehicle sensor 40.

The navigation HMI 62 includes a display device, a speaker, a touch panel, a key, and the like. The navigation HMI 62 may be made common to the HMI 30 partially or entirely.

For example, with reference to the first map information 64, the route determination unit 63 determines a route (hereinafter, also referred to as an "on-map route") from the position of the own vehicle M specified by the GNSS receiver 61 (or an input arbitrary position) to a destination input by the occupant using the navigation HMI 62. The first map information 64 is, for example, information in which a road shape is expressed by a link indicating a road and nodes connected by the link. The first map information 64 may include a curvature of a road, point of interest (POI) information, and the like. The on-map route is output to the MPU 70.

The navigation device 60 may perform route guidance using the navigation HMI 62 based on the on-map route. The navigation device 60 may transmit a current position and the destination to a navigation server via the communication device 20 and acquire a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided from the navigation device 60 into a plurality of blocks (for example, divides the on-map route by 100 [m] in a vehicle traveling direction), and determines a recommended lane for each block with reference to the second map information 72. For example, the recommended lane determination unit 71 determines which lane from the left the vehicle is to travel in. When a branching point is present in the on-map route, the recommended lane determination unit 71 determines a recommended lane such that the own vehicle M may travel along a reasonable route for advancing to a branch destination.

The second map information 72 is map information with higher accuracy than the first map information 64. The second map information 72 includes, for example, information on a center of a lane or information on a boundary of the lane. The second map information 72 may include road information, traffic regulation information, address information, facility information, telephone number information, and the like. The second map information 72 may be updated, as required, by the communication device 20 communicating with another device.

The driving operation part 80 includes, for example, a winker lever, an accelerator pedal, a brake pedal, a shift lever, and other operators in addition to the steering wheel 82. A sensor configured to detect an operation amount or presence or absence of an operation is attached to the driving operation part 80, and a detection result thereof is output to some or all of the control device 100, the travel driving force output device 200, the brake device 210, and the steering device 220.

The steering wheel 82 is not necessarily in an annular shape, and may be in the form of irregular steering, joy stick, button, or the like. A steering grip sensor 84 is attached to the steering wheel 82. The steering grip sensor 84 is implemented by a static capacitance sensor or the like, and outputs, to the control device 100, a signal capable of detecting whether the driver is gripping the steering wheel 82.

The winker 91 is a direction indicator implemented by a lamp (lamp body) or the like provided on each of a left side (for example, the left front and the left rear) and a right side (for example, the right front and the right rear) of the own vehicle M so as to be visible from the outside of the own vehicle M. The winker 91 is turned on or off in accordance with an operation of the winker lever configured to be operable by the driver.

The winker 91 may also function as a hazard lamp 93 that notifies presence or occurrence of an abnormality in the own vehicle M to the outside of the vehicle by simultaneous blinking (hereinafter also referred to as "hazard blinking") of the lamps provided on the left side and the right side of the own vehicle M. The hazard lamp 93 is an example of a notification device. Although the hazard lamp 93 is implemented by the winker 91 in the present embodiment, the hazard lamp 93 may be implemented by a lamp different from the winker 91.

The horn device 92 notifies the outside of the vehicle of the presence or occurrence of an abnormality in the own vehicle M by blowing a horn (hereinafter also referred to as "horn blowing"). The horn device 92 is another example of the notification device.

The travel driving force output device 200 outputs, to a wheel (specifically, drive wheels such as front wheels), a travel driving force (torque) for the own vehicle M to travel. The travel driving force output device 200 includes, for example, a combination of an internal combustion engine, an electric motor, a transmission, and the like, and an electronic control unit (ECU) configured to control the combination. For example, here, the transmission is a mechanical transmission (that is, a non-shift-by-wire transmission), and a shift lever included in the driving operation part 80 is mechanically connected to the transmission. The ECU of the travel driving force output device 200 controls the above-described configuration according to information received from the control device 100 or information received from the driving operation part 80.

The brake device 210 includes, for example, a brake caliper, a cylinder configured to transmit hydraulic pressure to the brake caliper, an electric motor configured to generate hydraulic pressure in the cylinder, and a brake ECU. The brake ECU controls the electric motor of the brake device 210 according to information received from the control device 100 or information received from the driving operation part 80, and outputs a braking torque to each wheel in response to a braking operation.

When the brake device 210 is continuously operated for a long time, a failure may occur in the electric motor or the like of the brake device 210. Supposing such a situation occurs, braking of the own vehicle M cannot be performed by the brake device 210. Therefore, it is desirable to avoid continuing to operate the brake device 210 for a long time as much as possible.

The steering device 220 includes, for example, a steering ECU and an electric motor. The electric motor of the steering device 220 changes an orientation of driven wheels, for example, by applying a force to a rack-and-pinion mechanism. The steering ECU drives the electric motor of the steering device 220 according to information received from the control device 100 or information received from the driving operation part 80 to change the orientation of the driven wheels.

The electric parking brake device 230 includes, for example, an electric motor and an electric parking brake ECU (hereinafter also referred to as "EPB-ECU"). The electric motor generates a gripping force (braking force) to be acting on a brake caliper of a wheel of the own vehicle M (for example, a rear wheel, that is, a non-drive wheel), by driving a brake pad so as to grip the brake caliper. The EPB-ECU controls the electric motor of the electric parking brake device 230 according to information received from the control device 100 or information received from the driving operation part 80 to fix the wheels of the own vehicle M. That is, the electric parking brake device 230 is configured to fix the wheels by electronic control.

The control device 100 is a computer that integrally controls the own vehicle M entirely, and includes, for example, a recognition unit 110, a driving control unit 120, a driver abnormality detection unit 130, a vehicle abnormality detection unit 140, and a notification control unit 150. For example, the recognition unit 110, the driving control unit 120, the driver abnormality detection unit 130, the vehicle abnormality detection unit 140, and the notification control unit 150 may be implemented by a hardware processor such as a central processing unit (CPU) executing a program (software).

Some or all of these components may be implemented by hardware (including circuitry) such as a large scale integration (LSI), an application specific integrated circuit (ASIC), a field-programmable gate array (FPGA), and a graphics processing unit (GPU), or may be implemented by cooperation of software and hardware. The program may be stored in advance in a storage device such as an HDD or a flash memory of the control device 100.

The recognition unit 110 recognizes a surrounding condition of the own vehicle M based on information received from the camera 10, the radar device 12, and the LIDAR 14 via the object recognition device 16. Specifically, the recognition unit 110 recognizes a position of an object around the own vehicle M, and a traveling state including a speed, an acceleration, and the like of the object. For example, the position of the object is recognized as a position on absolute coordinates with a representative point (a center of gravity, a drive shaft center, or the like) of the own vehicle M as an origin, and is used for control. The position of the object may be represented by a representative point such as a center of gravity or a corner of the object, or may be represented by a region. A "state" of the object may include an acceleration or jerk of the object, or an "action state" (for example, whether the object is changing lanes, or whether the object is about to change lanes). The object recognized by the recognition unit 110 includes, for example, another vehicle (hereinafter also referred to as a "preceding vehicle") M1 traveling in front of the own vehicle M. Here, the preceding vehicle may be a vehicle traveling in front of the own vehicle M in the same lane as the own vehicle M (for example, an own lane L1 described later).

For example, the recognition unit 110 recognizes a traveling environment in which the own vehicle M is traveling. As an example, the recognition unit 110 recognizes a traveling lane of the own vehicle M (hereinafter, also referred to as the "own lane L1") by comparing a pattern of road division lines (for example, an array of solid lines and broken lines) obtained from the second map information 72 with a pattern of road division lines around the own vehicle M recognized from an image captured by the camera 10. The recognition unit 110 may recognize the traveling lane by recognizing not only the road division lines but also a course boundary (road boundary) including a road division line, a road shoulder, a curbstone, a median strip, a guard rail, and the like. In this recognition, the position of the own vehicle M acquired from the navigation device 60 or a processing result of the INS may be added. For example, the recognition unit 110 may further recognize a predetermined stop position at which the own vehicle M should stop, such as a stop line (including a temporary stop line), a tollgate, or an obstacle on a road.

For example, when recognizing a traveling lane, the recognition unit 110 recognizes a position and a posture of the own vehicle M with respect to the traveling lane. As an example, the recognition unit 110 may recognize a deviation of a reference point of the own vehicle M from a lane center and an angle of a traveling direction of the own vehicle M with respect to a line connecting lane centers, as a relative position of the own vehicle M with respect to the traveling lane and a posture thereof. Alternatively, the recognition unit 110 may recognize a position of the reference point of the own vehicle M with respect to any side end portion (road division line or road boundary) of the traveling lane as the relative position of the own vehicle M with respect to the traveling lane.

The driver abnormality detection unit 130 detects an abnormality in the driver of the own vehicle M. Here, the abnormality in the driver refers to, for example, a state in which it is highly likely that the driver cannot perform a safe driving operation, such as a state in which the driver loses consciousness due to a sudden attack of illness, faintness, or the like, or a state in which the driver cannot concentrate on driving due to drowse, looking away, or the like.

The driver abnormality detection unit 130 detects an abnormality in the driver by analyzing an image of the driver vehicle captured by the driver monitor camera 50, for example. The driver abnormality detection unit 130 may detect an abnormality in the driver based on, for example, pressing of the SOS button 32. For example, the driver abnormality detection unit 130 may detect an abnormality in the driver when a steering angle detected by a steering angle sensor does not change for a predetermined period of time. For example, the driver abnormality detection unit 130 may detect an abnormality in the driver based on biological information such as a pulse or a body temperature of the driver or may detect an abnormality in the driver based on voice information in the own vehicle M such as a voice generated by the driver.

The vehicle abnormality detection unit 140 detects an abnormality in the electric parking brake device 230. As an example, the vehicle abnormality detection unit 140 periodically transmits an abnormality detection signal to the EPB-ECU. The vehicle abnormality detection unit 140 detects an abnormality in the electric parking brake device 230 when there is no response from the EPB-ECU within a predetermined period of time after the transmission of the abnormality detection signal.

In the present embodiment, the vehicle abnormality detection unit 140 also detects an abnormality in the brake device 210. As an example, the vehicle abnormality detection unit 140 periodically transmits an abnormality detection signal to the brake ECU. The vehicle abnormality detection unit 140 detects an abnormality in the brake device 210 when there is no response from the brake ECU within a predetermined period of time after the transmission of the abnormality detection signal.

The driving control unit 120 is configured to execute driving support control of supporting driving of the own vehicle M, based on a recognition result of the surrounding condition of the own vehicle M obtained by the recognition unit 110. The driving support control that may be executed by the driving control unit 120 includes collision mitigation control.

The collision mitigation control is for suppressing a collision between the own vehicle M and another object, and includes, for example, braking control of decelerating the own vehicle M when an object that is likely to collide with the own vehicle M is detected. In the braking control, for example, the driving control unit 120 decelerates the own vehicle M by instructing the brake ECU of the brake device 210 to generate a predetermined braking torque. A brake system that implements such collision mitigation control is also referred to as a collision mitigation brake system (CMBS).

In addition, the driving support control that may be executed by the driving control unit 120 also includes lane deviation suppression control. The lane deviation suppression control suppresses a deviation of the own vehicle M from the own lane L1, and includes, for example, steering control of returning the own vehicle M into the own lane L1 when the own vehicle M deviates from the own lane L1. In the steering control, for example, the driving control unit 120 returns the own vehicle M into the own lane L1 by instructing the steering ECU of the steering device 220 to change an orientation of driven wheels. Alternatively, in the steering control, the driving control unit 120 may steer the own vehicle M to return to the own lane L1 by controlling, via the brake device 210, a braking torque applied to each wheel.

The driving control unit 120 may appropriately decelerate or accelerate the own vehicle M by controlling, via the ECU of the travel driving force output device 200, a travel driving force (torque) output by the travel driving force output device 200.

When an abnormality in the driver is detected by the driver abnormality detection unit 130 during traveling of the own vehicle M, the driving control unit 120 configured to control the acceleration, deceleration and steering of the own vehicle M decelerates the own vehicle M to a speed VP1 by braking by the brake device 210. Here, the speed VP1 is a predetermined speed greater than zero, and may be set to an extremely low speed of, for example, about 10 km/h. Here, "traveling of the own vehicle M" may be traveling by manual driving of the driver, or may be traveling by automated driving in which the own vehicle M moves in an automated manner.

In addition, when an abnormality in the electric parking brake device 230 is detected by the vehicle abnormality detection unit 140 before the own vehicle M is decelerated to the speed VP1 or at the time the own vehicle M is decelerated to the speed VP1, the driving control unit 120 causes the own vehicle M to travel along the own lane L1, which is a traveling road the own vehicle M is currently traveling on, until a preceding vehicle is recognized by the recognition unit 110 after the own vehicle M is decelerated to the speed VP1. That is, the driving control unit 120 temporarily stops the braking performed by the brake device 210 at a time point when the own vehicle M is decelerated to the speed VP1, and causes the own vehicle M to travel along the own lane L1 without change. At this time, for example, the driving control unit 120 reduces the travel driving force, which is output from the travel driving force output device 200, as much as possible regardless of an accelerator operation performed by the driver. Such control is hereinafter also referred to as "creep equivalent control". When the own lane L1 is a flat road, the driving control unit 120 may cause the own vehicle M to perform creep traveling by performing the creep equivalent control.

Here, the creep traveling is traveling that is performed when a creep torque causing the own vehicle M to travel (that is, creep) at a low speed is transmitted from a driving force source to the wheels (specifically, the drive wheels) even when the accelerator pedal is not depressed (that is, an accelerator opening degree is close to zero) in a state where a shift position of the transmission is in a range other than a "P" range (parking range) or an "N" range (neutral range).

When the own lane L1 is a flat road, the own vehicle M travels at an extremely low speed equal to or lower than a constant speed VP2 (for example, equal to or lower than 10 [km/h]) larger than 0 [km/h] in the creep traveling. In the case of traveling at such an extremely low speed, the own vehicle M may be immediately stopped with a relatively small braking force. The speed VP1 and the speed VP2 may be the same speed (for example, 10 km/h) or may be different speeds. For example, the speed VP1 may be lower than the speed VP2.

In a case where the own lane L1 is a downward slope, a vehicle speed of the own vehicle M may increase even when the creep equivalent control is performed. However, in a case where the creep equivalent control is performed, even when the vehicle speed of the own vehicle M is temporarily increased due to the downward slope, the own vehicle M may be caused to perform creep traveling when the own lane L1 becomes flat thereafter.

As described, in a case where an abnormality in the driver and an abnormality in the electric parking brake device 230 are detected, the control device 100 (for example, the driving control unit 120) decelerates the own vehicle M to the speed VP1, and then causes the own vehicle M to travel (for example, creep travel) along the own lane L1 with braking performed by the brake device 210 being stopped until a preceding vehicle is recognized. Accordingly, it is possible to suppress a failure caused by operating the brake device 210 for a long time and to perform braking by the brake device 210 in response to recognition of the preceding vehicle. Therefore, even when an abnormality occurs in the driver and the wheels cannot be fixed by the electric parking brake device 230 in the own vehicle M of the non-shift-by-wire type, the safety of the own vehicle M may be ensured.

In a case where a preceding vehicle is recognized by the recognition unit 110 when the own vehicle M is traveling along the own lane L1 (specifically, when the own vehicle M is traveling along the own lane L1 after the own vehicle M is decelerated to the speed VP1 in response to detection of the abnormalities of the driver and the electric parking brake device 230. The same applies to the following), the driving control unit 120 may stop the own vehicle M by braking by the brake device 210. Accordingly, it is possible to suppress the own vehicle M from colliding with the preceding vehicle, thereby improving the safety of the own vehicle M.

When a preceding vehicle is recognized by the recognition unit 110 while the own vehicle M is traveling along the own lane L1, the driving control unit 120 may stop the own vehicle M by braking by the brake device 210, and stop the braking performed by the brake device 210 when a predetermined period of time (for example, 15 minutes) elapses since stop of the own vehicle M. Here, the predetermined period of time is determined in consideration of performance of the brake device 210 (specifically, a time during which the brake device 210 is continuously operable) and the like. Accordingly, as described later, it is possible to suppress a failure caused by operating the brake device 210 for a long time while suppressing damage caused when the own vehicle M collides with the preceding vehicle.

The control device 100 may release a door lock of the own vehicle M when the own vehicle M is stopped by braking performed by the brake device 210 in response to recognition of the preceding vehicle. As described, the door lock of the own vehicle M is released in response to stop of the own vehicle M so that a rescuer may rescue the driver of the own vehicle M more easily.

In response to a door of the own vehicle M being opened while the own vehicle M is traveling along the own lane L1, the driving control unit 120 may stop the own vehicle M by braking by the brake device 210. As described, the own vehicle M is stopped in response to the door of the own vehicle M being opened so that the rescuer may safely and easily rescue the driver of the own vehicle M.

When the own vehicle M reaches a predetermined stop position provided in the own lane L1 while the own vehicle M is traveling along the own lane L1, the driving control unit 120 may stop the own vehicle M by braking by the brake device 210. As described above, examples of the predetermined stop position include a stop line (including a temporary stop line), a tollgate, and an obstacle on a road. As described, the own vehicle M is stopped at a predetermined stop position, so that it is possible to suppress an accident caused by the own vehicle M not stopping at a stop position and improve safety of the own vehicle M.

When an abnormality in the electric parking brake device 230 is no longer detected during traveling of the own vehicle M along the own lane L1, the driving control unit 120 may fix the wheels by the electric parking brake device 230. Accordingly, even when an abnormality of the electric parking brake device 230 is erroneously detected due to some factor, it is possible to fix the wheels by the electric parking brake device 230 at an appropriate timing thereafter to stop the own vehicle M.

The driving control unit 120 may perform control (i) including: decelerating, in a case where an abnormality in the driver is detected and no abnormality in the brake device 210 is detected by the vehicle abnormality detection unit 140 during traveling of the own vehicle M, the own vehicle M to the speed VP1 by braking by the brake device 210; and stopping the braking performed by the brake device 210 to cause the own vehicle M to travel along the own lane L1 after the own vehicle M is decelerated to the speed VP1 until a preceding vehicle is recognized by the recognition unit 110 when an abnormality in the electric parking brake device 230 is detected by the vehicle abnormality detection unit 140 before the own vehicle M is decelerated to the speed VP1 or at the time the own vehicle M is decelerated to the speed VP1.

Further, the driving control unit 120 performs control (ii) including: controlling, in a case where an abnormality in the driver is detected and an abnormality in the brake device 210 is detected during traveling of the own vehicle M, the travel driving force output device 200 (that is, a drive device) to cause the own vehicle M to travel along the own lane L1, and fixing, when a traveling speed of the own vehicle M becomes within a predetermined range based on zero during traveling of the own vehicle M along the own lane L1, the wheels by the electric parking brake device 230. Here, the predetermined range may be, for example, a range in which an excessive impact does not occur on the own vehicle M or the electric parking brake device 230 even when the wheels are fixed by the electric parking brake device 230.

By executing the control (i) and (ii) by the driving control unit 120, it is possible to appropriately stop the own vehicle M not only when an abnormality in the driver occurs and an abnormality in the electric parking brake device 230 occurs, but also when an abnormality in the driver occurs and an abnormality in the brake device 210 occurs, and it is possible to improve the safety of the own vehicle M.

For example, after decelerating the own vehicle M to the speed VP1, the driving control unit 120 may perform control such that the own vehicle M performs creep traveling along the own lane L1 regardless of an accelerator operation (for example, an operation of depressing the accelerator pedal) with respect to the own vehicle M or a road gradient of the own lane L1. Accordingly, even when an abnormality in the driver occurs, it is possible to cause the own vehicle M to appropriately travel regardless of the accelerator operation with respect to the own vehicle M or the road gradient of the own lane L1. As an example, even when the driver faints with the accelerator pedal depressed, it is possible to cause the own vehicle M to perform creep traveling. As another example, even when the own lane L1 is an upward slope and the driver faints in a state where the driver releases his/her foot from the accelerator pedal, it is possible to suppress the own vehicle M from slipping back and to cause the own vehicle M to travel forward by creep traveling.

For example, when an abnormality in the driver is detected, the notification control unit 150 causes a predetermined notification device provided in the own vehicle M to perform notification indicating that an abnormality in the driver is detected. In the present embodiment, when an abnormality in the driver is detected, the notification control unit 150 notifies the outside of the vehicle M of the detection of the abnormality in the driver by using the horn device 92 and the hazard lamp 93. Hereinafter, this notification is also referred to as "notification to vehicle outside". By such notification to vehicle outside, it is possible to inform traffic participants around the own vehicle M that an abnormality occurs in the driver, and to prompt rescue of the driver and avoidance of an accident.

When an abnormality in the driver is detected, the notification control unit 150 may cause a predetermined notification device provided in the own vehicle M to perform notification of an instruction to set a shift position of the transmission of the own vehicle M to the "P" range (parking range) (hereinafter, also referred to as a "parking range instruction notification"). In the present embodiment, when an abnormality in the driver is detected, the notification control unit 150 causes the HMI 30 to perform the parking range instruction notification as notification to the inside of the own vehicle M (hereinafter, also referred to as a "notification to vehicle inside").

Figure 2:
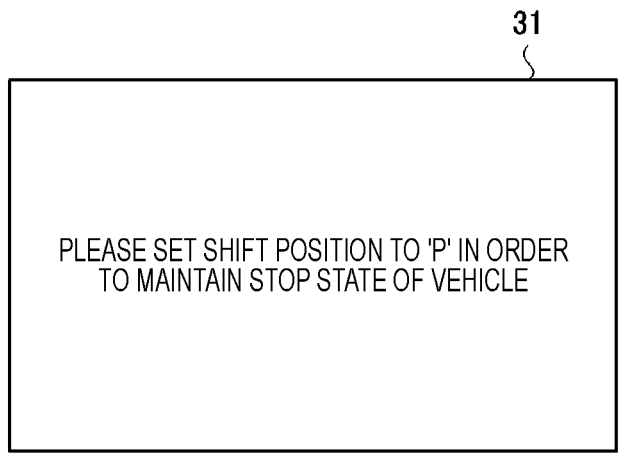
FIG. 2 is a diagram illustrating an example of notification to vehicle inside.

For example, as illustrated in FIG. 2, the notification to vehicle inside (that is, parking range instruction notification) is implemented by displaying a message "Please set the shift position to 'P' in order to maintain the stop state of the vehicle" on the MID 31 provided in the HMI 30. By such notification to vehicle inside, it is possible to prompt the rescuer to set the shift position of the own vehicle M to the "P" range, and the rescuer may stop the own vehicle M to safely and easily rescue the driver. Hereinafter, the above-described notification to outside of vehicle and notification to inside of vehicle may be collectively referred to as "notification to inside and outside of vehicle".

When the shift position of the transmission of the own vehicle M is set to the "P" range after an abnormality in the driver is detected, the notification control unit 150 may cause a predetermined notification device provided in the own vehicle M to perform notification for guiding a cancellation operation of ending the notification performed in response to the detection of the abnormality in the driver (hereinafter, also referred to as a "cancellation operation notification"). In response to the cancellation operation being performed, the notification control unit 150 may end the notification performed due to the detection of the abnormality in the driver.

Here, examples of the notification performed in response to detection of an abnormality in the driver include the notification to vehicle outside and the parking range instruction notification. The cancellation operation may be, for example, pressing of a predetermined switch button (not illustrated) provided inside the own vehicle M. In this case, the notification control unit 150, for example, causes the cancellation operation notification to be performed by displaying a message of "Driver abnormality handling system is in operation. Please press the button for ending" on the MID 31. Accordingly, the rescuer may end the notification performed in response to the detection of an abnormality in the driver by performing the cancellation operation after setting the shift position of the transmission of the own vehicle M to the "P" range.

<Specific Control Example of Control Device>

Figure 3:
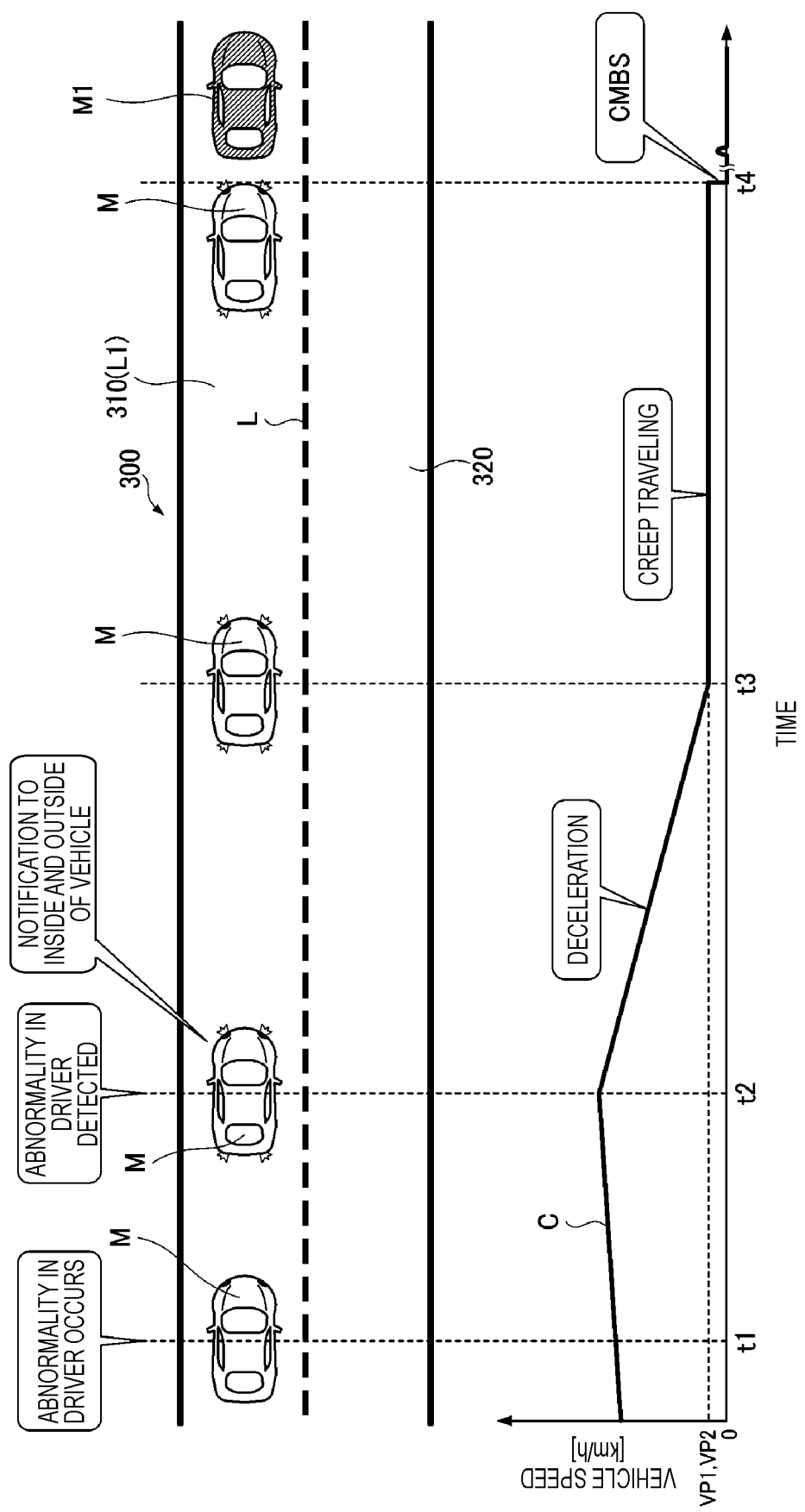
FIG. 3 is a diagram illustrating a specific control example of the control device 100.
Figure 4:
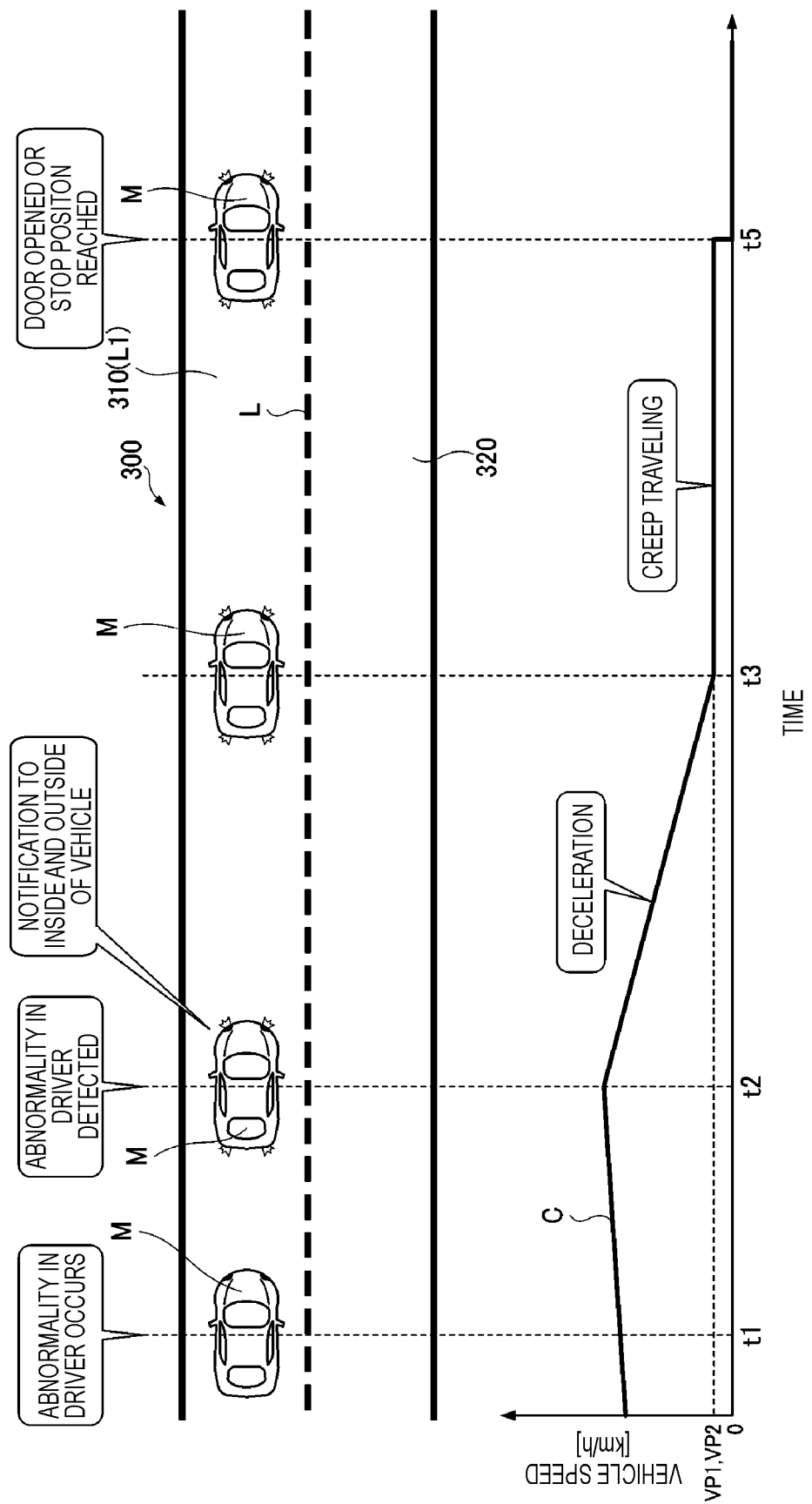
FIG. 4 is a diagram illustrating a specific control example of the control device 100.

Next, a specific control example of the control device 100 will be described with reference to FIGS. 3 and 4. In FIGS. 3 and 4, the own vehicle M at a predetermined time-point (time-point t1, t2, t3, t4, or t5 to be described later) during traveling of the own vehicle M on a road 300, and a transition of the vehicle speed of the own vehicle M (see a curve denoted by a reference sign C) are illustrated.

The road 300 illustrated in FIGS. 3 and 4 has a left lane 310 and a right lane 320 in which a direction from a left side to a right side in FIGS. 3 and 4 is set as a traveling direction.

A division line L as a road division line is provided at a boundary between the left lane 310 and the right lane 320. In FIGS. 3 and 4, the own vehicle M is traveling on the left lane 310. That is, in FIGS. 3 and 4, the left lane 310 is the own lane L1.

In the example illustrated in FIGS. 3 and 4, an abnormality occurs in the driver at the time-point t1, and the control device 100 detects the abnormality in the driver at the time-point t2 after the time-point t1. In the example illustrated in FIGS. 3 and 4, it is assumed that the control device 100 detects an abnormality in the electric parking brake device 230 before the time-point t2 (or the time-point t3 described later).

In the example illustrated in FIG. 3, the control device 100 starts the braking by the brake device 210 from the time-point t2 at which the abnormality in the driver is detected, and decelerates the own vehicle M to the speed VP1 (in the example illustrated in FIGS. 3 and 4, the speed VP1=the speed VP2). The control device 100 also starts the notification to vehicle outside by horn blowing and hazard lamp blinking from the time-point t2, and notifies a traffic participant around the own vehicle M that an abnormality occurs in the driver. Further, the control device 100 causes the MID 31 to perform the notification to vehicle inside (parking range instruction notification) illustrated in FIG. 2 from the time-point t2, thereby prompting a rescuer to set the shift position to the "P" range.

Then, at the time-point t3 when the own vehicle M decelerates to the speed VP1, the control device 100 stops the braking performed by the brake device 210 and causes the own vehicle M to travel along the own lane L1. At this time, the control device 100 performs the creep equivalent control. Accordingly, in the example illustrated in FIG. 3, the own vehicle M is creep traveling along the own lane L1. Thereafter, the control device 100 operates the CMBS to stop the own vehicle M at the time-point t4 at which a preceding vehicle M1 is recognized.

As described above, according to the present embodiment, even in the case where an abnormality occurs in the driver and when the wheels cannot be fixed by the electric parking brake device 230, it is possible to safely stop the own vehicle M using the existing CMBS when the preceding vehicle M1 is recognized while suppressing a failure caused by operating the brake device 210 for a long time.

In the example illustrated in FIG. 3, when a predetermined period of time elapses since the own vehicle M is stopped by the operation of the CMBS, the own vehicle M may restart traveling. Although there is a possibility that the own vehicle M collides with the preceding vehicle M1 from behind by restarting traveling, a vehicle speed at this time is extremely low due to the creep equivalent control. Therefore, even when the own vehicle M collides with the preceding vehicle M1 from behind, damage caused by the collision from behind is suppressed to the minimum. Then, since the own vehicle M that restarted traveling is stopped by the collision with the preceding vehicle M1 from behind, the rescuer may safely and easily rescue the driver.

On the other hand, the example illustrated in FIG. 4 is an example of a case where a door of the own vehicle M is opened or the own vehicle M reaches a predetermined stop position provided in the own lane L1 during traveling of the own vehicle M along the own lane L1.

In the example illustrated in FIG. 4, during traveling of the own vehicle M along the own lane L1, the control device 100 operates the brake device 210 to stop the own vehicle M at the time-point t5 at which the door of the own vehicle M is opened or the own vehicle M reaches the predetermined stop position.

As described, according to the present embodiment, during traveling of the own vehicle M along the own lane L1, the own vehicle M is stopped in response to the door of the own vehicle M being opened, and thus the rescuer may safely and easily rescue the driver. By performing the notification to vehicle inside (parking range instruction notification), the rescuer is prompted to set the shift position to the "P" range, and the rescuer may safely and easily rescue the driver of the own vehicle M.

Further, according to the present embodiment, during traveling of the own vehicle M along the own lane L1, the own vehicle M is stopped in response to the own vehicle M reaching a predetermined stop position. Accordingly, it is possible to suppress an accident that might be caused when the own vehicle M is not stopped at the stop position, and the safety of the own vehicle M may be improved.

<Processing Executed by Control Device 100>

Figure 6:
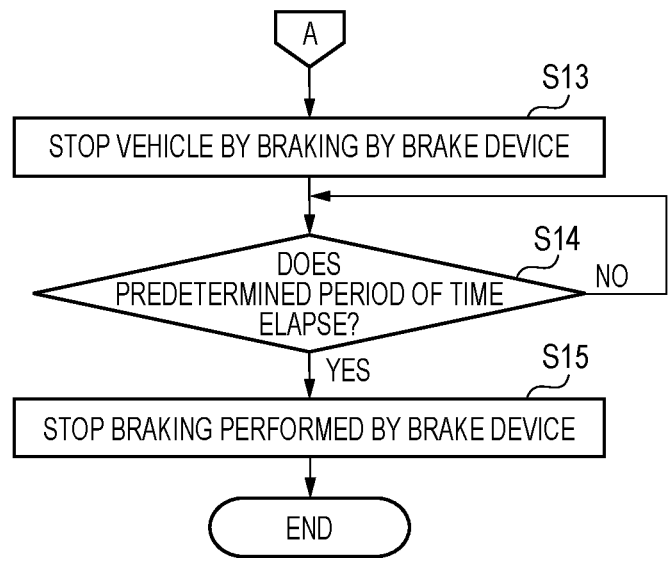
FIG. 6 is a flowchart illustrating an example of processing executed by the control device 100.
Figure 7:
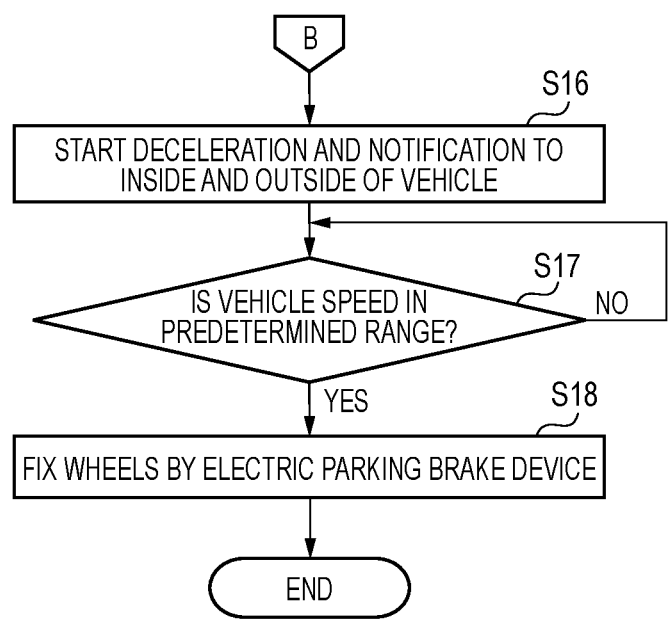
FIG. 7 is a flowchart illustrating an example of processing executed by the control device 100.

Next, an example of processing executed by the control device 100 will be described with reference to FIGS. 5 to 7. For example, the control device 100 executes processing illustrated in FIGS. 5 to 7 when an ignition of the own vehicle M is turned on.

Figure 5:
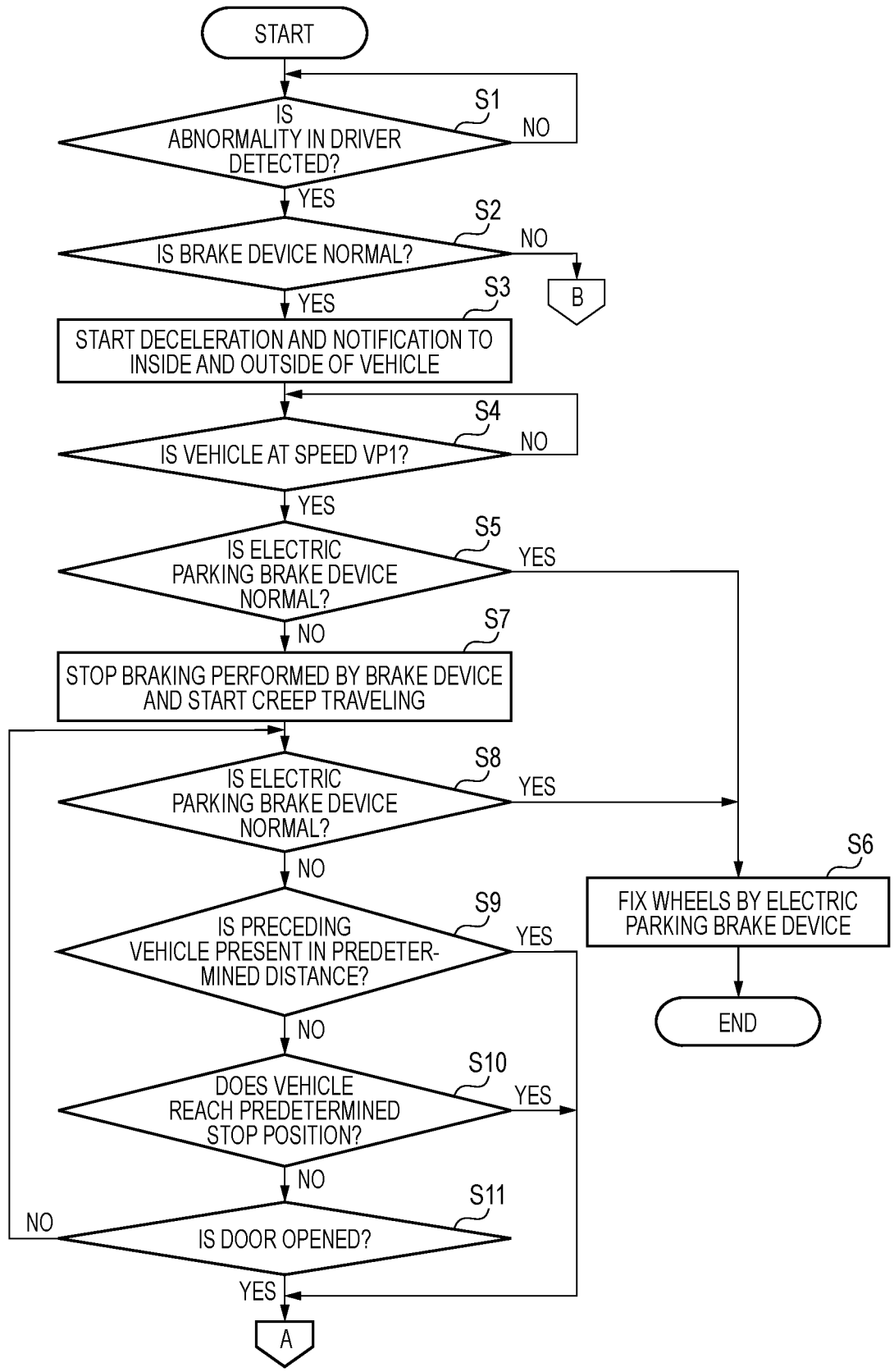
FIG. 5 is a flowchart illustrating an example of processing executed by the control device 100.

As illustrated in FIG. 5, the control device 100 first determines whether an abnormality in the driver is detected (step S1). When it is determined that no abnormality in the driver is detected (step S1: No), the control device 100 repeats the processing of step S1.

When it is determined that an abnormality in the driver is detected (step S1: Yes), the control device 100 determines whether the brake device 210 is in a normal state (step S2). When it is determined that the brake device 210 is not in a normal state (that is, in an abnormal state) (step S2: No), the control device 100 proceeds to processing of step S16 (described later) in FIG. 7.

On the other hand, when it is determined that the brake device 210 is in a normal state (step S2: Yes), the control device 100 starts deceleration performed by the brake device 210 and the notification to inside and outside of vehicle (step S3).

Then, the control device 100 determines whether a vehicle speed reaches the speed VP1 (step S4). When it is determined that the vehicle speed does not reach the speed VP1 (step S4: No), the control device 100 repeats the processing of step S4.

When it is determined that the vehicle speed reaches the speed VP1 (step S4: Yes), the control device 100 determines whether the electric parking brake device 230 is in a normal state (step S5). When it is determined that the electric parking brake device 230 is in a normal state (step S5: Yes), the control device 100 fixes the wheels by using the electric parking brake device 230 (step S6), stops the own vehicle M, and ends the series of processing. When the own vehicle M is stopped by the processing of step S6, the control device 100 may release a door lock of the own vehicle M.

On the other hand, when it is determined that the electric parking brake device 230 is not in a normal state (that is, in an abnormal state) (step S5: No), the control device 100 stops the braking by the brake device 210 and starts the creep traveling of the own vehicle M (step S7).

The control device 100 determines again whether the electric parking brake device 230 is in a normal state (step S8). When it is determined that the electric parking brake device 230 is in a normal state (step S8: Yes), the control device 100 proceeds to the processing of step S6, fixes the wheels by using the electric parking brake device 230 to stop the own vehicle M, and ends the series of processing.

On the other hand, when it is determined that the electric parking brake device 230 is not in a normal state (that is, in an abnormal state) (step S8: No), the control device 100 determines whether there is a preceding vehicle within a predetermined distance from the own vehicle M (step S9).

When it is determined that there is no preceding vehicle within the predetermined distance (step S9: No), the control device 100 determines whether the own vehicle M reaches a predetermined stop position (step S10). When it is determined that the own vehicle M does not reach the predetermined stop position (step S10: No), the control device 100 determines whether a door of the own vehicle M is opened (step S11). When it is determined that no door of the own vehicle M is opened (step S11: No), the control device 100 returns to the processing of step S8.

On the other hand, when it is determined that a door of the own vehicle M is opened (step S11: Yes), the control device 100 proceeds to processing of step S13 in FIG. 6. When it is determined that a preceding vehicle is present within the predetermined distance (step S9: Yes) and when it is determined that the own vehicle M reaches the predetermined stop position (step S10: Yes), the control device 100 proceeds to the processing of step S13 in FIG. 6.

In the processing of step S13, the control device 100 stops the own vehicle M by braking by the brake device 210 (for example, braking by CMBS) (step S13). When the own vehicle M is stopped by the processing of step S13, the control device 100 may release the door lock of the own vehicle M. Then, the control device 100 determines whether a predetermined period of time elapses since stop of the own vehicle M by the braking by the brake device 210 (step S14).

When it is determined that the predetermined period of time does not elapse since stop of the own vehicle M (step S14: No), the control device 100 repeats the processing of step S14. When it is determined that the predetermined period of time elapses (step S14: Yes), the control device 100 stops the braking performed by the brake device 210 (step S15), and ends the series of processing.

As described above, according to the present embodiment, in a case where an abnormality occurs in the driver (step S1: Yes), even when the electric parking brake device 230 is not normal (step S5: No), as long as the brake device 210 is normal (step S2: Yes), the own vehicle M may be stopped by braking performed by the brake device 210 (step S13). At this time, by appropriately stopping the braking performed by the brake device 210 (step S7, step S15) and causing the own vehicle M to travel (for example, creep traveling), it is possible to suppress the damage caused by collision with the preceding vehicle from behind to the minimum while suppressing a failure of the brake device 210.

On the other hand, when the brake device 210 is not in a normal state (step S2: No), as illustrated in FIG. 7, the control device 100 decelerates the own vehicle M by the creep equivalent control and starts the notification to inside and outside of vehicle (step S16). For example, at this time, the control device 100 controls the travel driving force output device 200 such that a travel driving force (torque) output from the travel driving force output device 200 becomes a creep torque regardless of the accelerator operation, thereby decelerating the own vehicle M until creep traveling is performed.

Then, the control device 100 determines whether the vehicle speed of the own vehicle M is within a predetermined range based on zero (step S17), and when the vehicle speed of the own vehicle M is within the predetermined range (step S17: Yes), fixes the wheels by using the electric parking brake device 230 (step S18), and ends the series of processing.

As described above, according to the present embodiment, in a case where an abnormality occurs in the driver (step S1: Yes), even when the brake device 210 is not in a normal state (step S2: No), it is possible to fix the wheels by using the electric parking brake device 230 (step S18), thereby stopping the own vehicle M.

As described above, according to the present embodiment, it is possible to ensure the safety of the own vehicle M even when an abnormality in the driver and an abnormality in the electric parking brake device 230 occur.

Although an embodiment of the present invention has been described above with reference to the drawings, it goes without saying that the present invention is not limited to the above-described embodiment. It is apparent that those skilled in the art may conceive of various modifications and changes within the scope described in the claims, and it is understood that such modifications and changes naturally fall within the technical scope of the present invention. In addition, the respective constituent elements in the above-described embodiment may be combined as desired without departing from the gist of the invention.

For example, although a case where the transmission of the own vehicle M is a mechanical transmission (non-shift-by-wire) is described in the above-described embodiment, the own vehicle M may be a "shift-by-wire" vehicle in which the control device 100 may control a shift position of the transmission. In this case, when an abnormality in a driver, an abnormality in an electric parking brake, or an abnormality in an electronic control shift occurs, the control device 100 may perform the processing of steps S9 to S15.

In the present specification and the like, at least the following matters are described. Although corresponding constituent elements and the like in the above-described embodiment are shown in parentheses, the present disclosure is not limited thereto.

(1) A vehicle control device (control device 100) for controlling a vehicle (own vehicle M), the vehicle including a wheel to be driven by a drive device, a brake device (brake device 210) configured to brake the wheel, and an electric parking brake device (electric parking brake device 230) configured to fix the wheel by electronic control, the vehicle control device including:
  a recognition unit (recognition unit 110) configured to recognize a surrounding condition of the vehicle;
  a driving control unit (driving control unit 120) configured to control acceleration, deceleration, and steering of the vehicle based on a recognition result of the recognition unit;
  a driver abnormality detection unit (driver abnormality detection unit 130) configured to detect an abnormality in a driver of the vehicle; and
  a vehicle abnormality detection unit (vehicle abnormality detection unit 140) configured to detect an abnormality in the electric parking brake device, in which,
  when an abnormality in the driver is detected by the driver abnormality detection unit during traveling of the vehicle, the driving control unit performs control to decelerate the vehicle to a predetermined speed greater than zero by braking by the brake device, and,
  in a case where the vehicle abnormality detection unit detects an abnormality in the electric parking brake device before the vehicle is decelerated to the predetermined speed or at a time the vehicle is decelerated to the predetermined speed, the driving control unit causes the vehicle to perform traveling along a traveling road until the recognition unit recognizes a preceding vehicle after the vehicle is decelerated to the predetermined speed.

When the brake device is continuously operated for a long time, the brake device may fail. According to (1), when an abnormality in the driver and an abnormality in the electric parking brake device is detected, the vehicle is decelerated to a predetermined speed, and thereafter, the vehicle is caused to travel along a traveling road until a preceding vehicle is recognized. Accordingly, it is possible to suppress a failure caused by operating the brake device for a long time and to perform braking by the brake device in response to recognition of a preceding vehicle. Thus, even when an abnormality occurs in the driver and when the wheels cannot be fixed by the electric parking brake device, the safety of the vehicle may be ensured.

(2) The vehicle control device according to (1), in which
the driving control unit stops the vehicle by braking by the brake device when the preceding vehicle is recognized by the recognition unit during the traveling of the vehicle along the traveling road.

According to (2), it is possible to prevent the vehicle from colliding with the preceding vehicle and improve the safety of the vehicle.

(3) The vehicle control device according to (1) or (2), in which
the driving control unit
stops the vehicle by braking by the brake device when the preceding vehicle is recognized by the recognition unit during the traveling of the vehicle along the traveling road, and
stops the braking performed by the brake device when a predetermined period of time elapses since stop of the vehicle by the braking performed by the brake device.

According to (3), it is possible to suppress a failure caused by operating the brake device for a long time while suppressing damage caused when the vehicle collides with the preceding vehicle.

(4) The vehicle control device according to any one of (1) to (3), in which
the vehicle control device releases a door lock of the vehicle when the vehicle is stopped by braking performed by the brake device.

According to (4), since the door lock of the vehicle may be released in response to stop of the vehicle, the rescuer may easily rescue the driver of the vehicle.

(5) The vehicle control device according to any one of (1) to (3), in which
the driving control unit stops the vehicle by braking performed by the brake device when a door of the vehicle is opened during the traveling of the vehicle along the traveling road.

According to (5), since the vehicle may be stopped in response to the opening of the door of the vehicle, the rescuer may safely and easily rescue the driver.

(6) The vehicle control device according to any one of (1) to (5), in which
the driving control unit stops the vehicle by braking by the brake device when the vehicle reaches a predetermined stop position provided in the traveling road during the traveling of the vehicle along the traveling road.

According to (6), since the vehicle may be stopped at the predetermined stop position, an accident that might be caused by not stopping the vehicle at the stop position may be suppressed, and the safety of the vehicle may be improved.

(7) The vehicle control device according to any one of (1) to (6), in which
the driving control unit fixes the wheel by using the electric parking brake device when no abnormality in the electric parking brake device is detected during the traveling of the vehicle along the traveling road.

According to (7), even when an abnormality in the electric parking brake device is erroneously detected due to some cause, it is possible to stop the vehicle by fixing the wheel by using the electric parking brake device at an appropriate timing thereafter.

(8) The vehicle control device according to any one of (1) to (7), in which
the vehicle abnormality detection unit further detects an abnormality in the brake device, and
the driving control unit performs a control including
(i) decelerating, in a case where an abnormality in the driver is detected and no abnormality in the brake device is detected by the vehicle abnormality detection unit during traveling of the vehicle, the vehicle to decelerate to the predetermined speed by braking performed by the brake device, and causing, in a case where an abnormality in the electric parking brake device is detected by the vehicle abnormality detection unit before the vehicle is decelerated to the predetermined speed or at a time the vehicle is decelerated to the predetermined speed, the vehicle to perform traveling along the traveling road until the preceding vehicle is recognized by the recognition unit, and
(ii) controlling, in a case where an abnormality in the driver is detected and an abnormality in the brake device is detected by the vehicle abnormality detection unit during traveling of the vehicle, the drive device to cause the vehicle to perform traveling along the traveling road, and causing, when a traveling speed of the vehicle is within a predetermined range based on zero during the traveling of the vehicle along the traveling road, the electric parking brake device to fix the wheel.

According to (8), even when an abnormality in the driver occurs and when an abnormality in the brake device occurs, it is possible to appropriately stop the vehicle and improve the safety of the vehicle.

(9) The vehicle control device according to any one of (1) to (8), in which
the driving control unit causes the vehicle to perform creep traveling along the traveling road regardless of an accelerator operation to the vehicle or a road gradient of the traveling road after decelerating the vehicle to the predetermined speed.

According to (9), even when an abnormality in the driver occurs, it is possible to cause the vehicle to travel appropriately regardless of the accelerator operation with respect to the vehicle or the road gradient of the traveling road.

(10) The vehicle control device according to any one of (1) to (9), in which
the vehicle further includes a notification device configured to perform notification to inside and outside of the vehicle,
the vehicle control device further includes a notification control unit configured to control the notification device, and, when an abnormality in the driver is detected, the notification control unit causes the notification device to perform notification indicating that the abnormality in the driver is detected.

According to (10), the occurrence of an abnormality in the driver is informed to a traffic participant around the vehicle, and rescuing of the driver and avoidance of an accident are facilitated.

(11) The vehicle control device according to any one of (1) to (10), in which
the vehicle further includes a notification device configured to perform notification to inside and outside of the vehicle,
the drive device drives the wheel via a transmission,
the vehicle control device further includes a notification control unit configured to control the notification device, and,
when an abnormality in the driver is detected, the notification control unit causes the notification device to perform notification of an instruction to set a shift position of the transmission to a parking range.

According to (11), the rescuer may be prompted to set the shift position to the parking range, and the rescuer may stop the vehicle to safely and easily rescue the driver.

(12) The vehicle control device according to claim 11, in which,
when the shift position of the transmission is set to the parking range after the abnormality in the driver is detected, the notification control unit causes the notification device to perform notification for guiding a cancellation operation to end the notification performed in response to detection of the abnormality in the driver, and,
in response to the cancellation operation, the notification control unit ends the notification performed in response to the detection of the abnormality in the driver.

According to (12), the rescuer may perform the release operation after the shift position of the transmission of the own vehicle is set to the parking range, thereby ending the notification performed in response to the detection of the abnormality in the driver.

What is claimed is:

1. A vehicle control device for controlling a vehicle, the vehicle including a wheel to be driven by a drive device, a brake device configured to brake the wheel, and an electric parking brake device configured to fix the wheel by electronic control,
the vehicle control device comprising circuitry configured to:
recognize a surrounding condition of the vehicle;
control acceleration, deceleration, and steering of the vehicle based on a recognition result of the surrounding condition of the vehicle;
detect an abnormality in a driver of the vehicle; and
a vehicle abnormality detection unit configured to detect an abnormality in the electric parking brake device, wherein,
when an abnormality in the driver is detected during traveling of the vehicle, the circuitry performs control to decelerate the vehicle to a predetermined speed greater than zero by braking by the brake device, and,
in a case where an abnormality in the electric parking brake device is detected before the vehicle is decelerated to the predetermined speed or at a time the vehicle is decelerated to the predetermined speed, the circuitry causes the vehicle to perform traveling along a traveling road until a preceding vehicle is recognized after the vehicle is decelerated to the predetermined speed.

2. The vehicle control device according to claim 1, wherein
the circuitry stops the vehicle by braking by the brake device when the preceding vehicle is recognized during the traveling of the vehicle along the traveling road.

3. The vehicle control device according to claim 1, wherein the circuitry
stops the vehicle by braking by the brake device when the preceding vehicle is recognized during the traveling of the vehicle along the traveling road, and
stops the braking performed by the brake device when a predetermined period of time elapses since stop of the vehicle by the braking performed by the brake device.

4. The vehicle control device according to claim 1, wherein
the vehicle control device releases a door lock of the vehicle when the vehicle is stopped by braking performed by the brake device.

5. The vehicle control device according to claim 1, wherein
the circuitry stops the vehicle by braking performed by the brake device when a door of the vehicle is opened during the traveling of the vehicle along the traveling road.

6. The vehicle control device according to claim 1, wherein
the circuitry stops the vehicle by braking by the brake device when the vehicle reaches a predetermined stop position provided in the traveling road during the traveling of the vehicle along the traveling road.

7. The vehicle control device according to claim 1, wherein
the circuitry fixes the wheel by using the electric parking brake device when no abnormality in the electric parking brake device is detected during the traveling of the vehicle along the traveling road.

8. The vehicle control device according to claim 1, wherein
the circuitry further detects an abnormality in the brake device, and
the circuitry performs a control including
(i) decelerating, in a case where an abnormality in the driver is detected and no abnormality in the brake device is detected during traveling of the vehicle, the vehicle to decelerate to the predetermined speed by braking performed by the brake device, and causing, in a case where an abnormality in the electric parking brake device is detected before the vehicle is decelerated to the predetermined speed or at a time the vehicle is decelerated to the predetermined speed, the vehicle to perform traveling along the traveling road until the preceding vehicle is recognized, and
(ii) controlling, in a case where an abnormality in the driver is detected and an abnormality in the brake device is detected during traveling of the vehicle, the drive device to cause the vehicle to perform traveling along the traveling road, and causing, when a traveling speed of the vehicle is within a predetermined range based on zero during the traveling of the vehicle along the traveling road, the electric parking brake device to fix the wheel.

9. The vehicle control device according to claim 1, wherein
the circuitry causes the vehicle to perform creep traveling along the traveling road regardless of an accelerator operation to the vehicle or a road gradient of the traveling road after decelerating the vehicle to the predetermined speed.

10. The vehicle control device according to claim 1, wherein
the vehicle further includes a notifier configured to perform notification to inside and outside of the vehicle,
the circuitry is further configured to control the notifier, and,
when an abnormality in the driver is detected, the circuitry causes the notifier to perform notification indicating that the abnormality in the driver is detected.

11. The vehicle control device according to claim 1, wherein
the vehicle further includes a notifier configured to perform notification to inside and outside of the vehicle,
the drive device drives the wheel via a transmission,
the circuitry is further configured to control the notifier, and,
when an abnormality in the driver is detected, the circuitry causes the notifier to perform notification of an instruction to set a shift position of the transmission to a parking range.

12. The vehicle control device according to claim 11, wherein,
when the shift position of the transmission is set to the parking range after the abnormality in the driver is detected, the circuitry causes the notifier to perform notification for guiding a cancellation operation to end the notification performed in response to detection of the abnormality in the driver, and,
in response to the cancellation operation, the circuitry ends the notification performed in response to the detection of the abnormality in the driver.

* * * * *